US005752059A

United States Patent [19]
Holleran et al.

[11] Patent Number: 5,752,059
[45] Date of Patent: May 12, 1998

[54] APPARATUS AND METHOD FOR REPRESENTING ELECTRONIC MAIL

[75] Inventors: Patrick A. Holleran, Santa Cruz, Calif.; Yan Arrouye, Paris, France; Cordell R. Ratzlaff, Palo Alto, Calif.; Stephen Fisher, Menlo Park, Calif.; John S. Evans, Mountain View, Calif.

[73] Assignee: Apple Computer, Inc., Cupertino, Calif.

[21] Appl. No.: 997,075

[22] Filed: Dec. 29, 1992

[51] Int. Cl.$^6$ ............................................. G06F 17/28
[52] U.S. Cl. ............................................. 395/800
[58] Field of Search ............ 379/201, 93; 395/275, 395/800, 159; 364/400; 358/440; 380/9

[56] References Cited

U.S. PATENT DOCUMENTS

| | | | |
|---|---|---|---|
| 4,604,710 | 8/1986 | Amezcua et al. | 395/275 |
| 4,734,931 | 3/1988 | Bourg et al. | 379/93 |
| 5,065,347 | 11/1991 | Pajak et al. | 395/159 |
| 5,239,577 | 8/1993 | Bates et al. | 379/201 |
| 5,247,575 | 9/1993 | Sprague et al. | 380/9 |

*Primary Examiner*—Kevin J. Teska
*Assistant Examiner*—Dan Fiul
*Attorney, Agent, or Firm*—Blakely, Sokoloff, Taylor & Zafman

[57] ABSTRACT

In a computer system, an apparatus for depicting an electronic mail address in either a field format or a string format. In a field format, the components of the electronic mail address is parsed into a plurality of fields. Each field represents a particular attribute of the electronic mail address. In a string format, the electronic mail address is comprised of a string of characters in a syntax specified by the protocol of the corresponding electronic mail system. A template having syntax information corresponding to the protocol is used to convert an electronic mail address from a field format to a string format and vice versa. Hence, a user has the option of entering an electronic mail address and having it displayed or edited in either a field format or a string format.

32 Claims, 12 Drawing Sheets

APPARATUS AND METHOD FOR REPRESENTING ELECTRONIC MAIL

FIELD OF THE INVENTION

The present invention pertains to the field of computer network systems. More particularly, the present invention relates to an apparatus and method for representing electronic mail in a computer network.

BACKGROUND OF THE INVENTION

In the evolution of computer systems, highly centralized mainframe computers initially dominated the industry. Later, less expensive minicomputers were developed which offered the end user greater versatility. With the advent of personal computers and workstations, computing power was finally distributed to end users at the desktop level. Personal computers and workstations are relatively small, self-contained computer systems which are typically placed on the user's desk. They commonly include hard and/or floppy disk drives for storing data and computer programs. Thereby, a user conveniently has at his or her own disposal a dedicated computer system, upon which the user can retrieve, process and store data. Because personal computers and workstations are relatively inexpensive, yet have the processing power to handle most tasks, they have rapidly proliferated into offices, homes, and schools.

Ultimately, transceivers were incorporated as part of the personal computers and workstations. Transceivers provide those personal computers and workstations with the capability of transmitting and receiving digital data and performing any necessary signal conversions. Numerous independent and separate personal computers and workstations can be interconnected by transmission lines, channels, or trunks, which are used to conduct bits of digital data between the connected devices. Thereby, hitherto isolated personal computers and workstations thusly connected can communicate with one another over a computer "network."

Computer networks are becoming increasingly popular as they allow end users to communicate and share ideas with each other, as well as share files, application programs, and peripheral hardware. For example, individuals hooked up to a particular computer network can share one or more printers, storage devices such as disk drives, modems, fax machines, etc. Likewise, application programs for word processing, data bases, spread sheets, games, etc. can be shared amongst the network's users.

Furthermore, a file server can be implemented to expedite and control the sharing of files on the computer network. By using a file server, one user can work on a particular file, put it on the server, and another different user on the network can retrieve the file from the server, edit or otherwise amend that particular file, put it back on the server so that yet another user can access that particular file.

Another aspect associated with computer networks is their ability to let users communicate with one another. For example, one user can type a message onto his or her personal computer and can then direct the computer to send that message to one or more recipients on the computer network. This type of system is known as an "electronic mail" system. In addition to sending typed messages, a user can send electronic copies of files, programs, databases, images, etc. Indeed, multiple users on a computer network can type messages which appear on the other's screens on a real time basis.

The mechanism which allows a user to define where the information is to be sent is known as an electronic mail address. The electronic mail address describes the destination location of the information to be sent. On occasion, it may also include some routing information. It is analogous to the addresses used in mailing letters via the postal service. When mailing a letter, the post office needs to know for whom the letter is intended, the number and street, and the city, state, zip code, and country of the recipient. Likewise, when sending a message through a computer network, the sender needs to designate the electronic destination of the information to be sent.

For small networks having few users and computers, electronic mailing addresses can be specified in a relatively simple and straight forward manner. However, computer networks are often quite extensive and complex, encompassing a large number of end users. Moreover, local area networks can be interconnected to form expansive, enterprise-size networks. Repeaters can be utilized to copy and forward digital data from one network to another, simulating one large network from the combination of two or more separate but similar networks. In cases wherein networks employ differing protocols (e.g., Ethernet, Token Bus, Token Ring, etc.), bridges can be utilized to act as an interface between the networks so that they may be connected together. Routers can be used to connect networks having dissimilar topologies. Other devices and circuits have been developed so that various computer networks having different cabling schemes, access methods, protocols, operating systems, applications, and computing devices can all be interconnected to form one vast computer network system spanning large geographic areas. By implementing satellites, radio systems, and fiber optic technology, computer networks can span the entire world.

As computer networks become more complex and complicated, so too have the addresses for electronic mail. Addresses for different types of electronic mail systems often require different syntaxes for specifying the necessary information. A syntax specifies how the pieces of information comprising the electronic mailing address is to be expressed. If a user departs from a given syntax utilized by that particular computer mail system, the electronic mail would not reach its intended recipient. Mail systems differ both in the information they require as part of an address and the way that information has to be specified. Thus, when a user wishes to send an electronic mail, the user must not only know the destination address, but also the proper syntax for that computer network.

Hence, one problem associated with electronic mailing systems is the difficulty in specifying an electronic mailing address. Listed below are examples of the many different forms an electronic mailing address can take:

1) c=de/ad=dbp/pn=walter_w_tietz/o=telekom/ou=ftz/ou=t/ou =t2/ou=t21

2) isaac @ goanna.cs.rmit.OZ.AU 3) macintosh-request%felix.uucp @ uunet.uu.net 4) 21765edt%msu @ cunyvm.cuny.edu 5) holleran @ apple.com @ internet#

6) Patrick_Holleran.NC_PROJ_LEAD @ gateway.q-m.apple.com

7) PAT#_HOLLERAN.CSD @ ANGUS5#

One method for assisting users with electronic mailing addresses is to provide directories listing the correct addresses, similar to a telephone book. Unfortunately, in the real world, one does not always have a directory readily available. People often obtain electronic mailing addresses from business cards and other printed materials.

Another method for assisting users in specifying and translating electronic mailing addresses involves eliminating the need to understand syntactical requirements by allowing the specification of an address by breaking the string of characters comprising that address into separate fields. Each field may have a corresponding label, similar to fields on a tax form. The user may simply enter the information in the appropriate field. The computer then combines the information in all fields into the appropriate address. The user is not required to know the proper syntax, thereby simplifying how an address is specified. However, the disadvantage with this approach is that it is rather cumbersome when conveying one's electronic address to someone else. For example, it is difficult to print the electronic mailing address in "field form" onto a business card.

Therefore, a useful improvement is an apparatus and method which allows a user to specify an electronic mailing address in the simplest and most appropriate way: either as a string of characters arranged in a syntactically correct way, as for example when an address is entered from a business card, or as information entered in fields in a form, when the syntax is not known.

SUMMARY AND OBJECTS OF THE INVENTION

In view of the problems associated with electronic mail systems in computer networks, one object of the present invention is to allow a user to specify an electronic mailing address in a simple manner.

Another object of the present invention is to convert a received electronic mailing address into a form which is easily comprehensible.

Another object of the present invention is to convert an electronic mailing address to a form which can readily be conveyed to a third party.

These and other objects of the present invention are implemented in a computer system capable of representing electronic mailing addresses in either a field format or a string format and in switching back and forth between the two forms.

In a field format, the electronic mailing address is broken into separate fields, wherein each field represents one particular component of the address. In a string format, the electronic mailing address is represented as a character string. A number of templates corresponding to a number of different types of electronic mailing systems may be stored on the computer system. A template contains information relating to the syntax utilized by a specific electronic mailing system. By utilizing a template, the same electronic address can be converted from a field format to a string format and vice versa.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for representing electronic mail addresses is described. In the following description, for the purposes of explanation, numerous specific details such as menus, windows, labels, icons, syntaxes for different electronic mail protocols, etc., are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
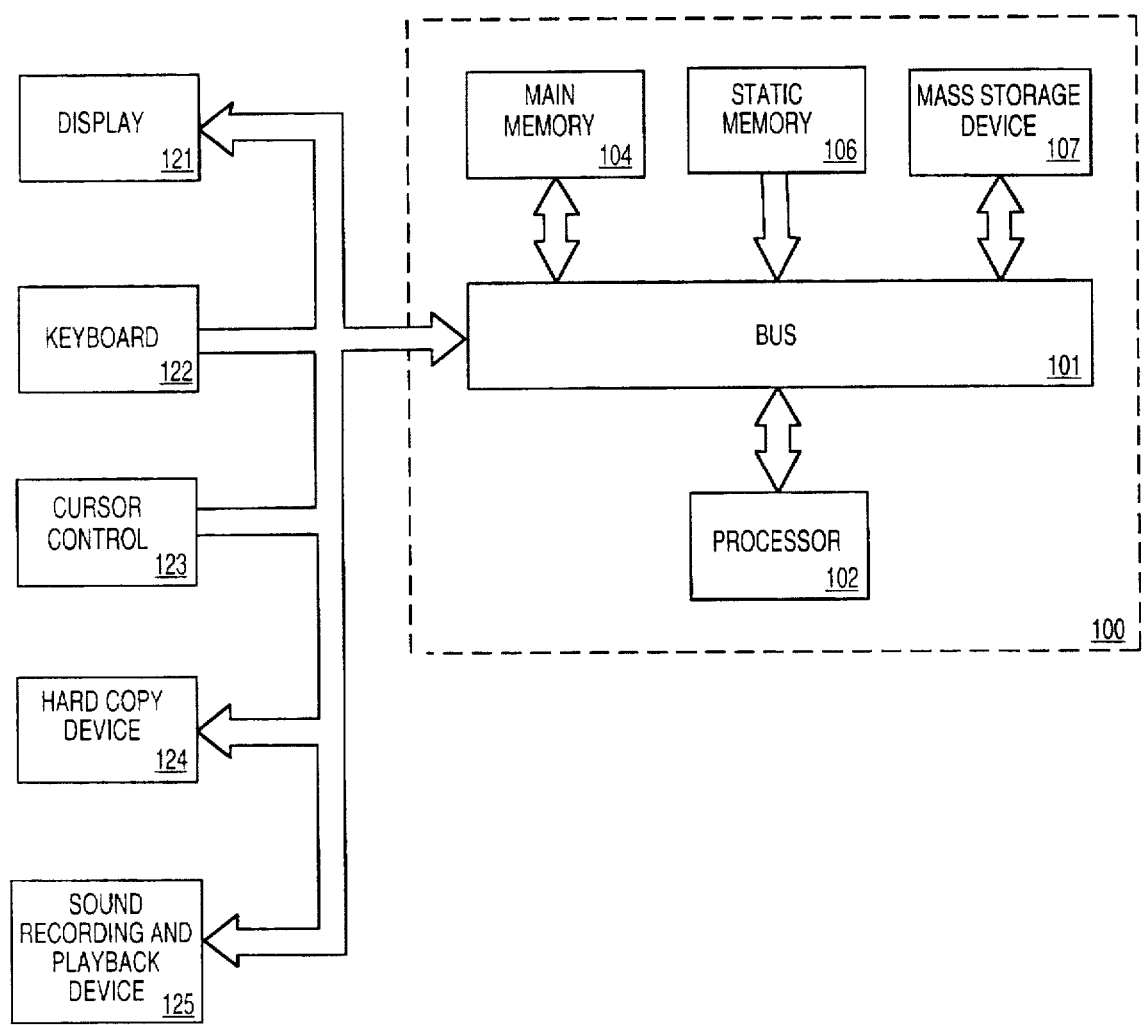
FIG. 1 is a block diagram of a computer system upon which the preferred embodiment of the present invention can be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

Another device which may be coupled to bus 101 is hard copy device 124 which may be used for printing instructions, data, or other information on a medium such as paper, film, or similar types of media. Additionally, computer system 100 can be coupled to a device for sound recording and/or playback 125 such as an audio digitizer coupled to a microphone for recording information. Further, the device may include a speaker which is coupled to a digital to analog (D/A) converter for playing back the digitized sounds. Finally, computer system 100 can be a terminal in a computer network (e.g., a LAN).

In the currently preferred embodiment, computer system 100 is one of the Macintosh® family of personal computers such as the Macintosh® II manufactured by Apple® Computer, Inc. of Cupertino, Calif. (Apple and Macintosh are registered trademarks of Apple Computer, Inc.). Processor 102 is one of the 68000 families of microprocessors, such as the 68000, 68020, or 68030 manufactured by Motorola, Inc. of Schaumburg, Ill.

In the currently preferred embodiment, the present invention is related to the use of an information card as applied to a computer system. When an information card file on the computer system is opened, the user is presented with a window on a computer screen which provides information concerning a certain individual.

Figure 2:
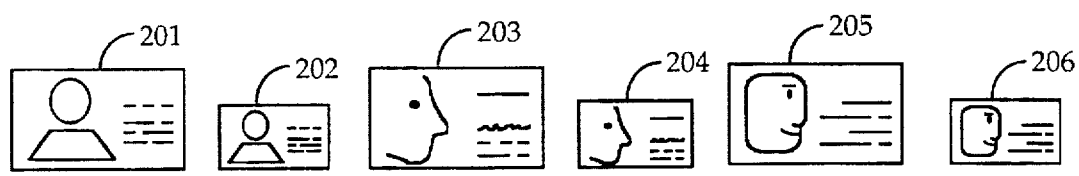
FIG. 2 shows icon designs which can be used to represent business cards.

FIG. 2 shows some examples of icon designs 201–206 which can be used to represent the business cards. These business cards contain various pieces of information concerning those individuals, such as their name, address, organization, as well as phone numbers and electronic mail addresses. The information displayed in a business card window include dialog items such as editable or static text. Different sets of information are presented on separate "panels" or "card surfaces". A business card could contain numerous panels containing information about that individual. Navigation from panel to panel is accomplished by implementing pop-up menus. The description of the contents of each page is depicted as a menu item. Pop-up menus are displayed in a relatively small amount of space on the display screen and allow the user to inspect all of the available pages by clicking and scanning the pages. Furthermore, they permit direct access to any page without requiring the user to move through pages he or she is not interested in to find the desired information.

Figure 3:
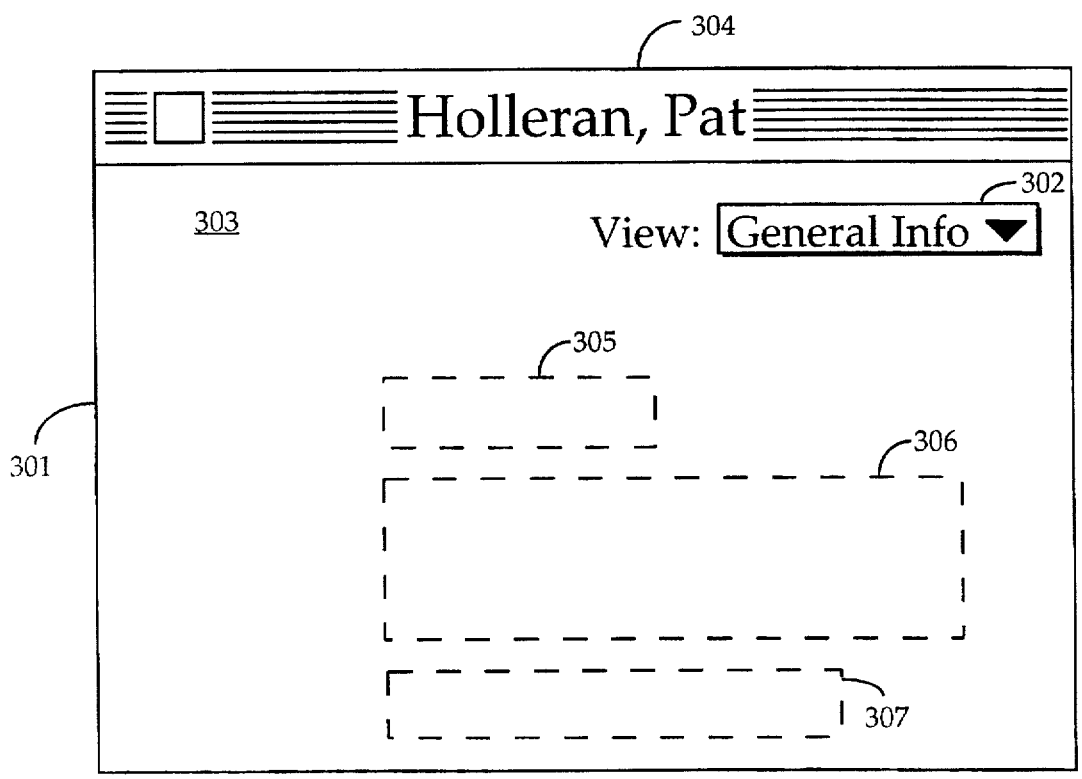
FIG. 3 shows a business card file which has been opened.

FIG. 3 shows a business card 301 which has just been opened. The pop-up menu 302, labeled "view" in the upper right hand corner, allows the user to move to other panels of the business card. Panel 303 displays information concerning the named individual Holleran, Pat 304 as named at the top of business card 301. Panel 303 contains 3 information fields—a name field 305, an address field 306 and a phone number field 307.

Figure 4:
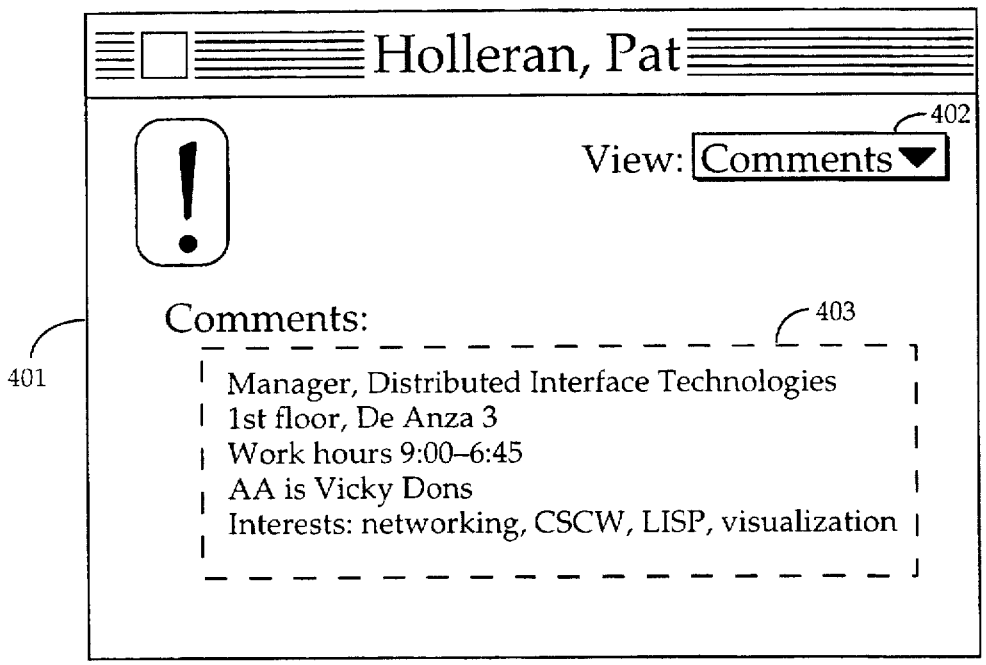
FIG. 4 shows a comment window associated with a business card.

Another panel is used to store comments. The comment panel allows users to store information which isn't accommodated in other fields. FIG. 4 shows a comment window 401 for the individual Pat Holleran. The view field 402 specifies the comments panel. The comments field 403 can include various personal information. Searches in directories and address books may include information from the comment field. Consequently, this provides a flexible mechanism to search for information across the directory. For example, a user could search for people interested in LISP. The search result would include Pat Holleran.

Figure 5:
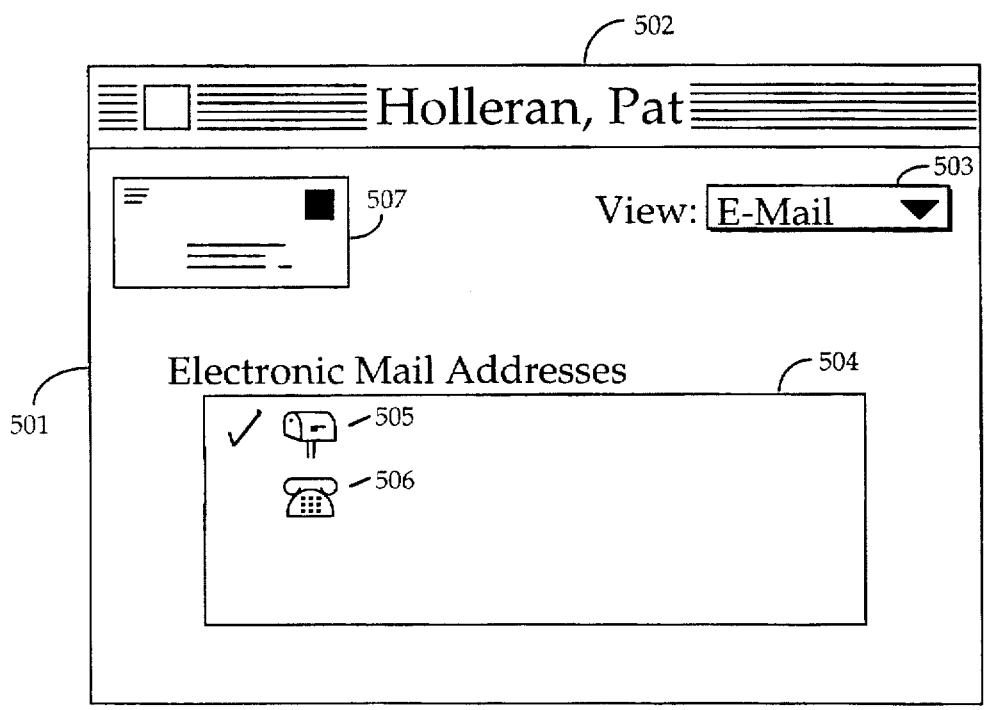
FIG. 5 shows a window on a computer display for representing electronic mailing addresses.

Another panel provides electronic mail addresses. FIG. 5 shows an electronic mail address window 501. The view field 503 depicts electronic mail (E-Mail). The electronic mail address field 504 contains various electronic mail addresses for the specified individual 502, Pat Holleran. For example, Pat Holleran has both a server address 505 and a home/modem-based address 506 (AppleMail is a trademark of Apple Computer, Inc.). Electronic mail addresses can be created and placed in the address field 504. Alternatively, an electronic mail address can be dragged into the field 504 from other places. These electronic mail address "objects" 505–506 contain the information required to send a letter or a file to another person. This information is different, depending on the type of mail system at the destination, the gateways between the sender and the receiver, etc.

To send a letter or a file, an address object or a business card can be dragged to the "To" field of a letter. These objects can also be dragged to the desk-top or to any folder or volume. These objects can also be opened to display the electronic mail information. This is accomplished by positioning a movable cursor over an address icon 507 and clicking on the icon. An address template is displayed. The type of information displayed differs, depending on the type of electronic mailing protocol involved, such as AppleMail server, AppleMail NBP, AppleMail/telephone, SMTP, X.400, etc.

Figure 6A:
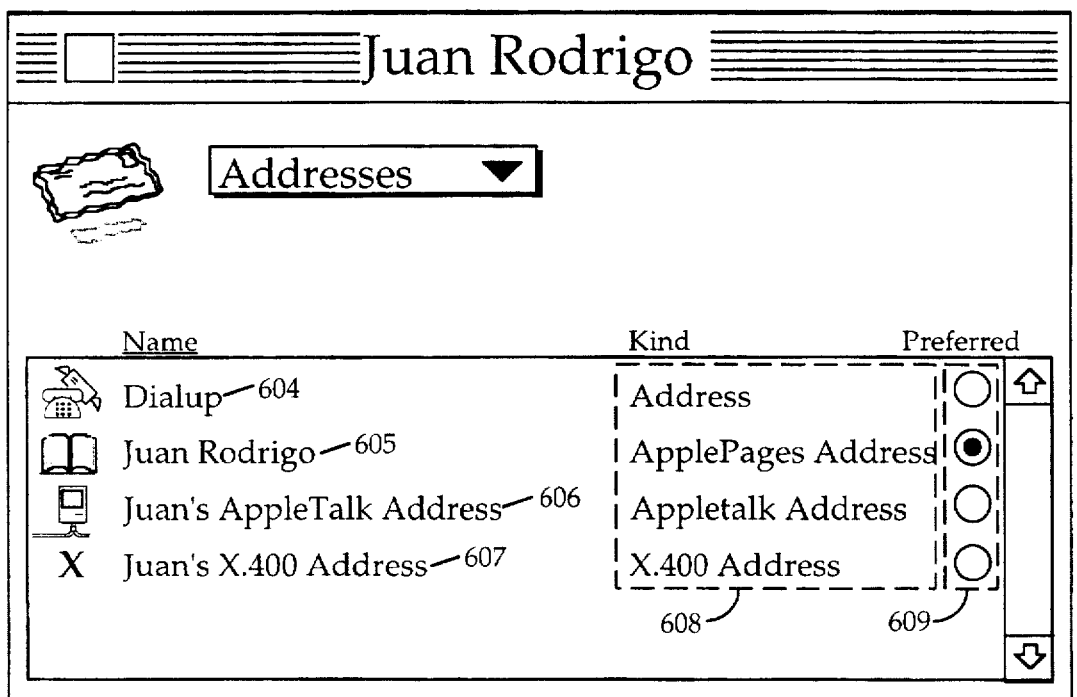
FIG. 6A–C shows windows used in conduction with the display of an X.400 address.
Figure 6B:
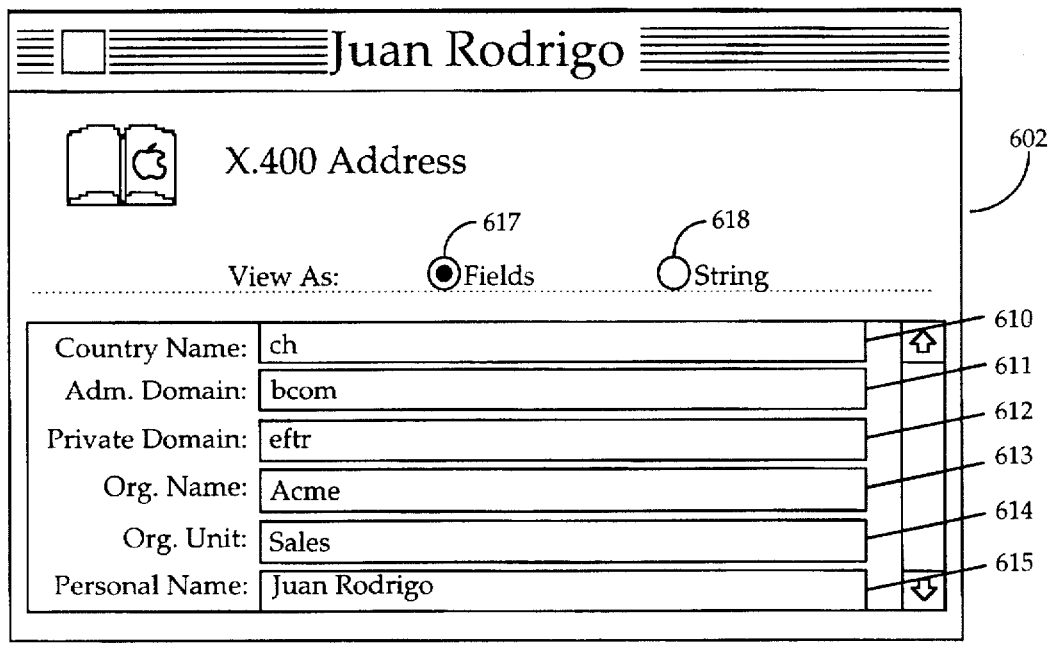
Figure 6C:
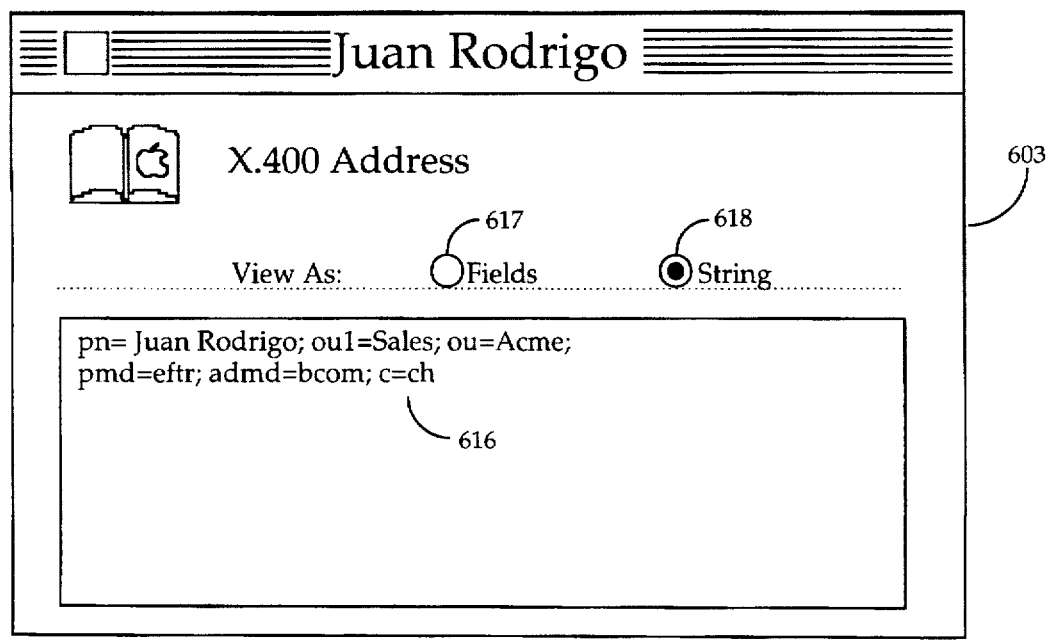

In the present invention, the address information can be viewed either in a string format or as a field format. FIGS. 6A–C show windows 601–603 used in conjunction with displaying an X.400 address. In window 601, a list of different addresses such as dialup 604, Juan Rodrigo 605, Juan's AppleTalk address 606, and Juan's X.400 address 607 are displayed. The kinds 608 corresponding to each of the listed addresses are also shown. Also, radio buttons 609 are displayed for allowing the selection of one of the listed addresses 604–607.

Window 602 displays the X.400 address of Juan Rodrigo, which was "opened" as a field format. Specific components of the electronic address are shown in separate fields. Each component is displayed in its corresponding field. For example, the country name 610, administrative domain 611, private domain 612, organization name 613, organization unit 614, and personal name 615 are displayed as separate fields. In this mode, a user can fill in the address information for each of the fields.

Window 603 displays the X.400 address of Juan Rodrigo which was "opened" as a string format. The components comprising the X.400 address is displayed in the form of a string of characters 616. In this mode, a user can enter an address as a series of characters.

In addition, two radio buttons 617 and 618 are provided to allow a user to toggle between the string and the field format. By positioning a moveable cursor over radial button 617 and clicking a button on the mouse, the field format is displayed, similar to the one depicted in window 602. Conversely, if the user wishes to display the address in a string format, the user would position the movable cursor over radio button 618 and then click the button. The address is displayed in a string format, similar to the one depicted in window 603.

Alternatively, a stylus or pen can be used to select radio buttons 604 and 605. Rather than moving a cursor on the screen, a particular radio button can be designated by using a stylus or pen to touch that button. A field icon 606 is displayed next to radio button 604. A character string icon 607 is displayed next to radio button 605.

By selecting the appropriate radio buttons 604 and 605, a user has the capability of entering an electronic mail address in either the string format of window 601 or the field format of window 701. Once the electronic address has been entered, the user has the capability of toggling between the string format and the field format by toggling between the two radio buttons.

In the present invention, a template is used to automatically convert from a field format to a string format and vice versa. A template is a stand-alone resource which can be added to the computer system to allow different kinds of information which are stored in directories or elsewhere in the system to be displayed in different ways. For example, users may add templates to their computer systems by dragging them to the "Extensions" folder in the Macintosh System Folder. In the case of electronic mail addresses, templates provide the ability to display the address information in both the "field" and "string" format. These templates contain the information which describes how the components of the address along with other decorative and descriptive information appear on the screen. The template also contains "code resources" which permit the address components to be assembled and disassembled so that they can be displayed in the two different formats. Thus, a user has the flexibility of entering an electronic mail address in a field format, without being required to have prior knowledge of that particular mailing system's syntax.

Depending on the circumstance, it might be more convenient for a user to enter an electronic mail address straight off a business card. This can be accomplished by specifying the string format and directly copying the electronic mail address into the string field. Once an address has been entered in as a string format, the address can be made more comprehensible to the user if it were to be displayed in a field format. Again, toggling between radio buttons 617 and 618 provides this flexibility. Conversely, once an electronic mail address is entered in as a field format, the address can be converted by the computer and displayed in a string format, thereby making it easier for the user to give his or her address to a third party.

For example, a user can click on radio button 617 to specify a field format. The user can enter the necessary information in each of the fields. By clicking on radio button 618, the computer automatically selects the template corresponding to that particular electronic mailing system and converts the information given in the fields into a string format. Conversely, a user can specify a field format. By clicking on radio button 617, the computer automatically parses the text string so that the information appears in the proper fields.

Figure 7:
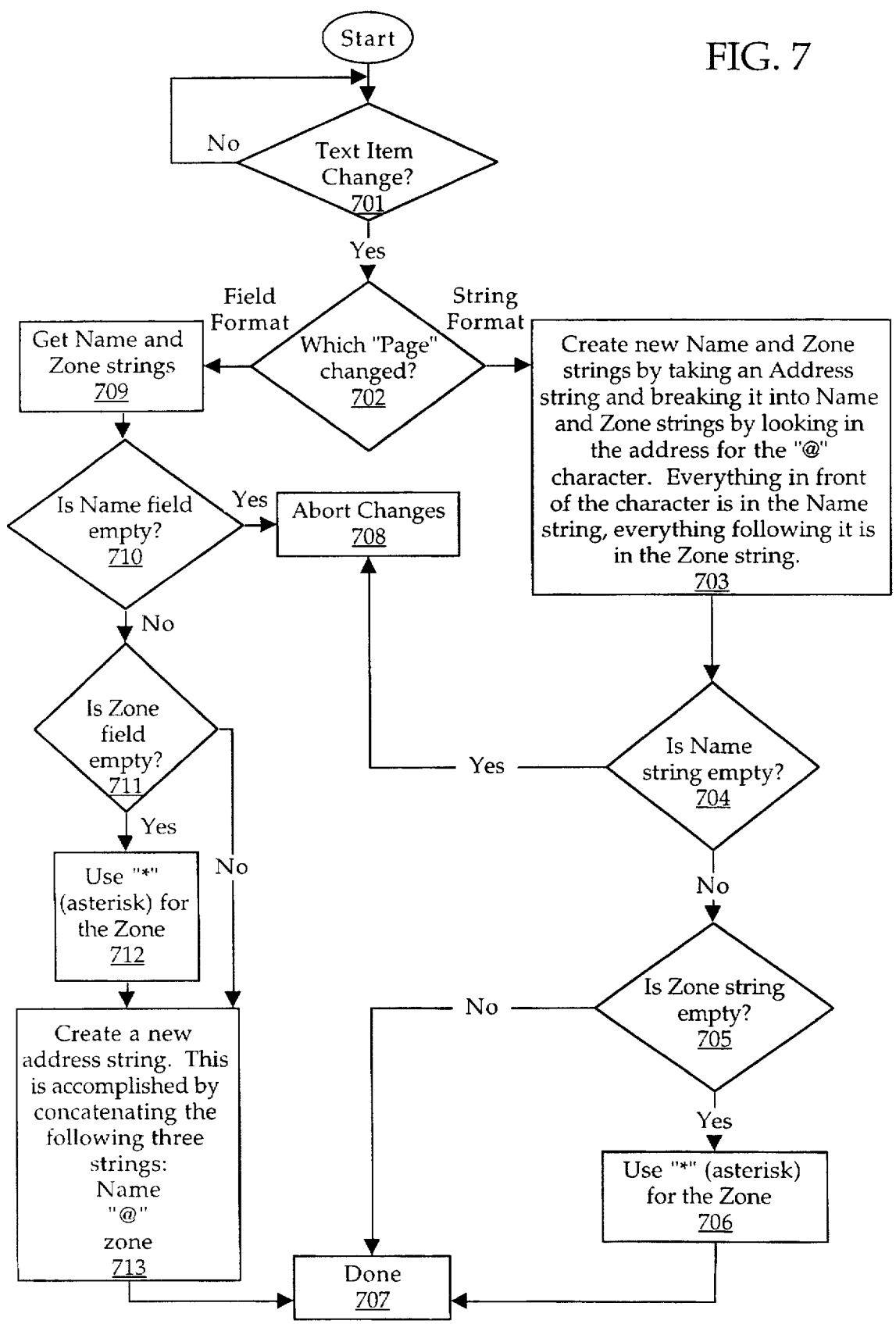
FIG. 7 is a flowchart showing the steps of a sample template.

FIG. 7 is a flowchart showing the steps of a sample template of the present invention. A determination is made whether a text item has been changed, step 701. If there has been no change, the template takes no further action. It waits for a change in a text item. Once a change in a text item is detected, a determination is made as to which "page" had changed, step 702. If a string format is specified, new Name and Zone strings are created, step 703. This is accomplished by taking an address string and breaking it into Name and Zone strings by looking in the address for the "@" character. Everything in front of the "@" character is designated as belonging in the Name string, and everything after the "@" character belongs in the Zone string. A determination is made as to whether the Name string is empty, step 704. If the Name string is empty, the changes are aborted, step 708. Otherwise, a determination is made as to whether the Zone string is empty, step 705. If the Zone string is empty, an asterisk "*" is used for the Zone, step 706, and the template is finished, step 707. If the Zone string is not empty, the template is finished, step 707.

If a field format is specified, the Name and Zone strings are fetched, step 709. A determination is made as to whether the Name field is empty, step 710. If the Name field is empty, the changes are aborted, step 708. Otherwise, a determination is made as to whether the Zone field is empty, step 711. If the Zone field is empty, an asterisk "*" is used for the Zone, step 712, and step 713 is performed. Otherwise, a new address string is created, step 713. This is accomplished by concatenating the following three strings: name, "@", and zone. The template is finished, step 707.

Figure 8:
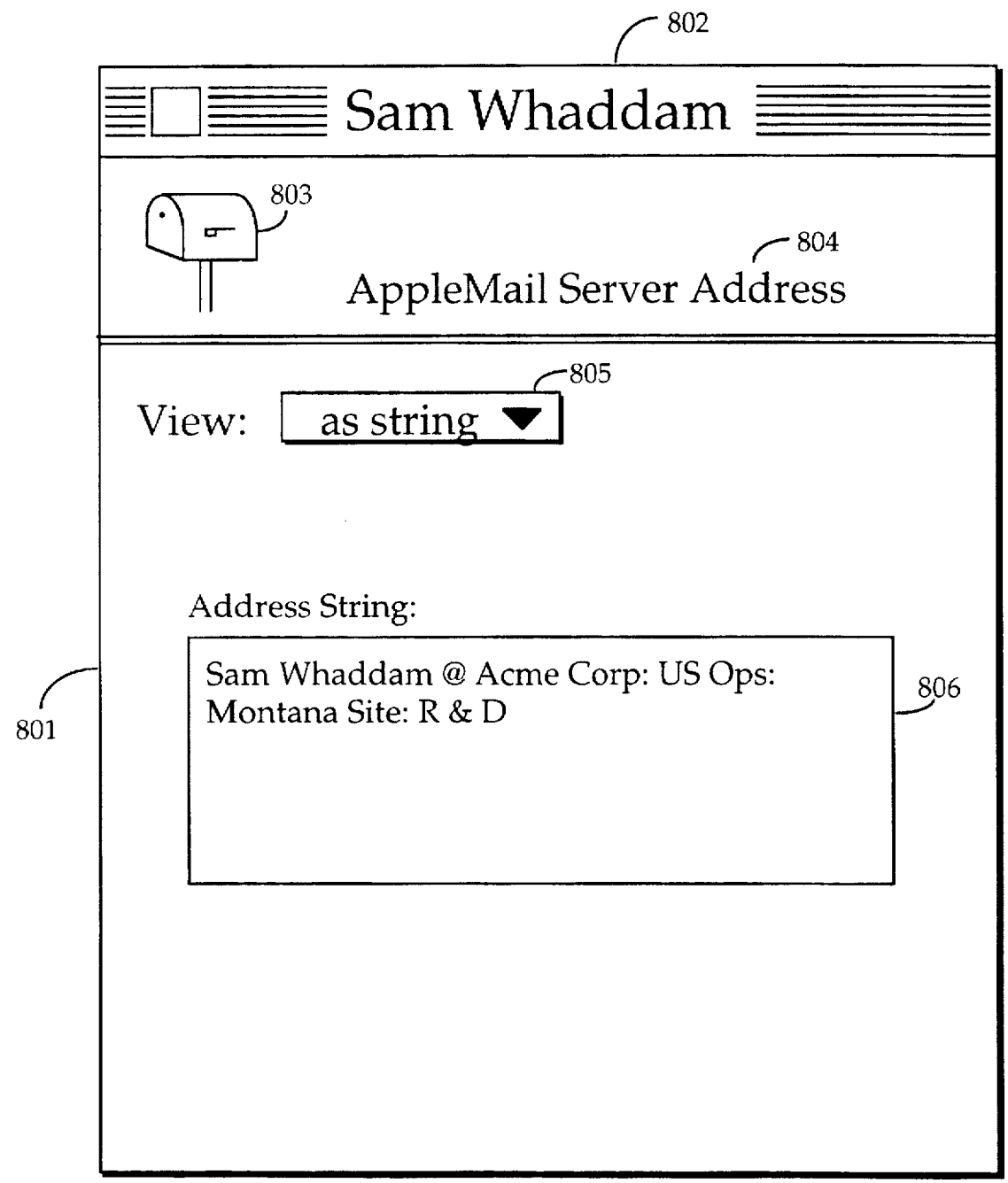
FIG. 8 shows a window of an alternative embodiment of the present invention.

FIG. 8 shows another embodiment of the present invention. Window 801 displays the name 802 of the individual corresponding to that particular mailing address. Icon 803 denotes the protocol corresponding to that particular mailing address. That particular protocol is also specified in field 804 (e.g., AppleMail Server Address). View field 805 specifies one of two formats: "as string" and "in fields". When the "as string" format is specified by a user, an address string field 806 is displayed. A string of characters corresponding to the electronic mailing address of the individual is displayed in string field 806. For example, the electronic mail address for Sam Whaddam can be "Sam Whaddam @ Acme Corp: US Ops: Montana Site: R & D". The user can enter an electronic address as it may appear on a business card or electronic mail listing directly into field 806.

Figure 9:
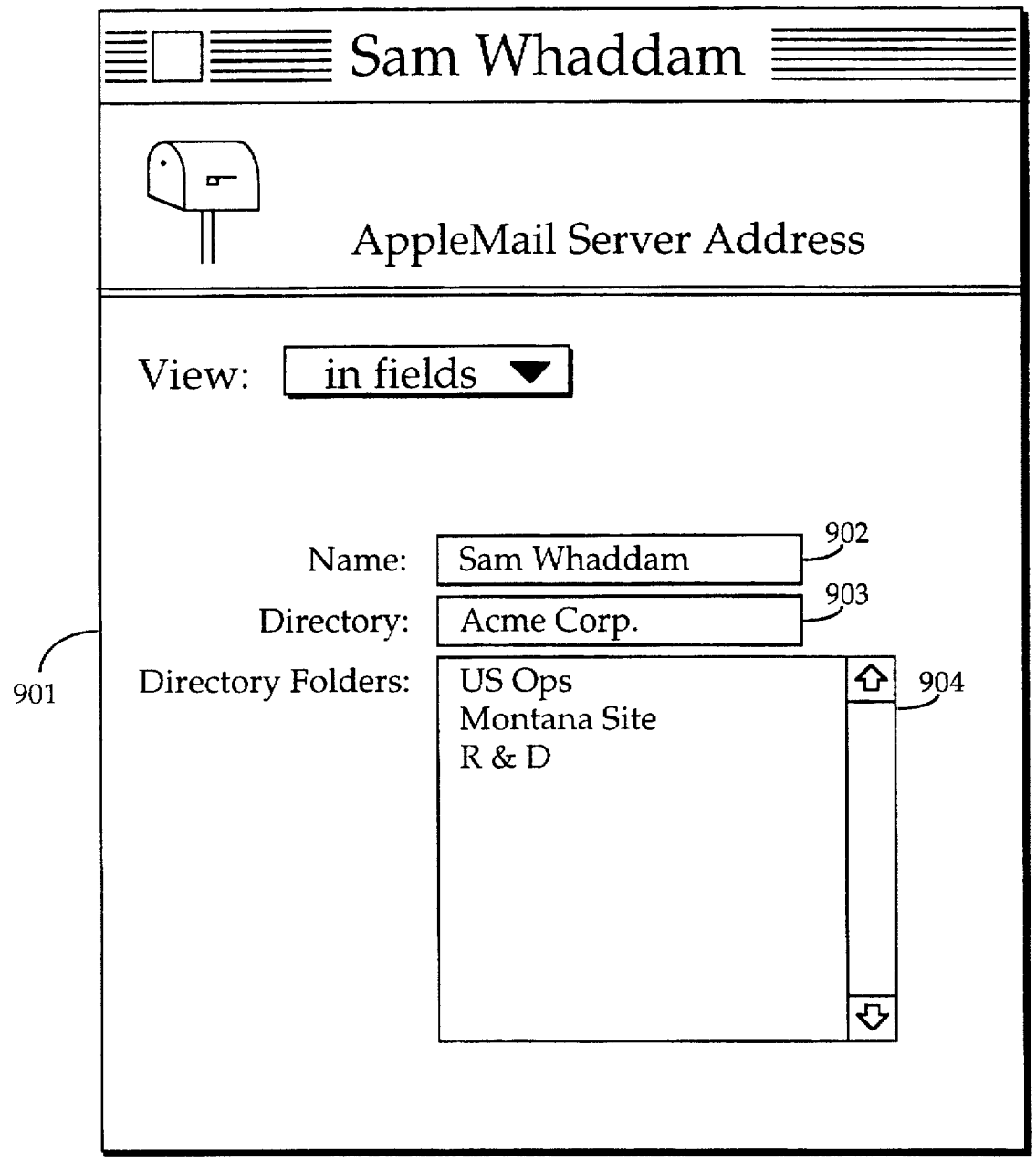
FIG. 9 shows a window for displaying an electronic address in a field format.

The user can specify that this same address be displayed in a field format. FIG. 9 shows a window 901 for displaying an electronic address in a field format. The computer system automatically parses the information contained in the address string into its appropriate field. For example, name field 902 displays the name of that individual, Sam Whaddam. Directory field 903 displays the company, Acme Corp. Directory folders field 904 is used to display more specific information of the destination.

Figure 10:
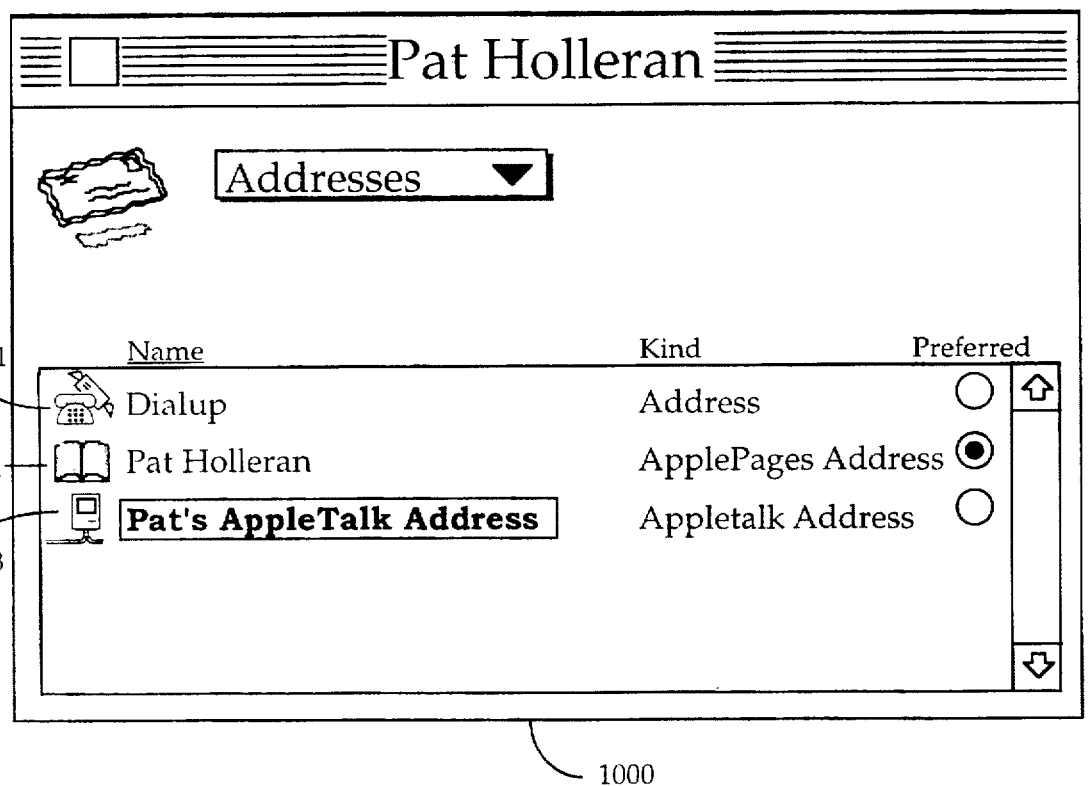
FIG. 10 shows electronic mail addresses represented as objects and displayed by icons on a computer screen.

In short, an electronic mail address can be conceptualized as an object. In one embodiment, the object can be represented on a computer screen as an icon in a list, as shown in FIG. 10. For example, in window 1000, object 1001 represents the "dialup" address; object 1002 represents the ApplePages address of "Pat Holleran"; and object 1003 represents "Pat's AppleTalk Address" (ApplePages is a trademark of Apple Computer, Inc.). An object may be "opened" to display the specific components of the electronic address.

Figure 11A:
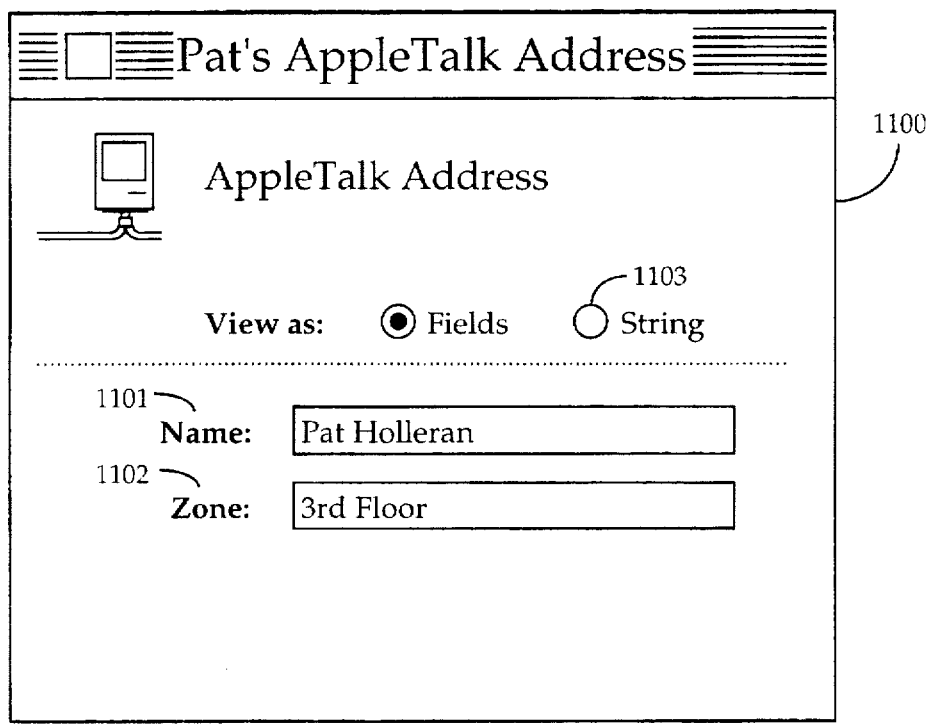
FIG. 11a shows a window displaying the contents of an address in a field format once it has been opened.
Figure 11B:
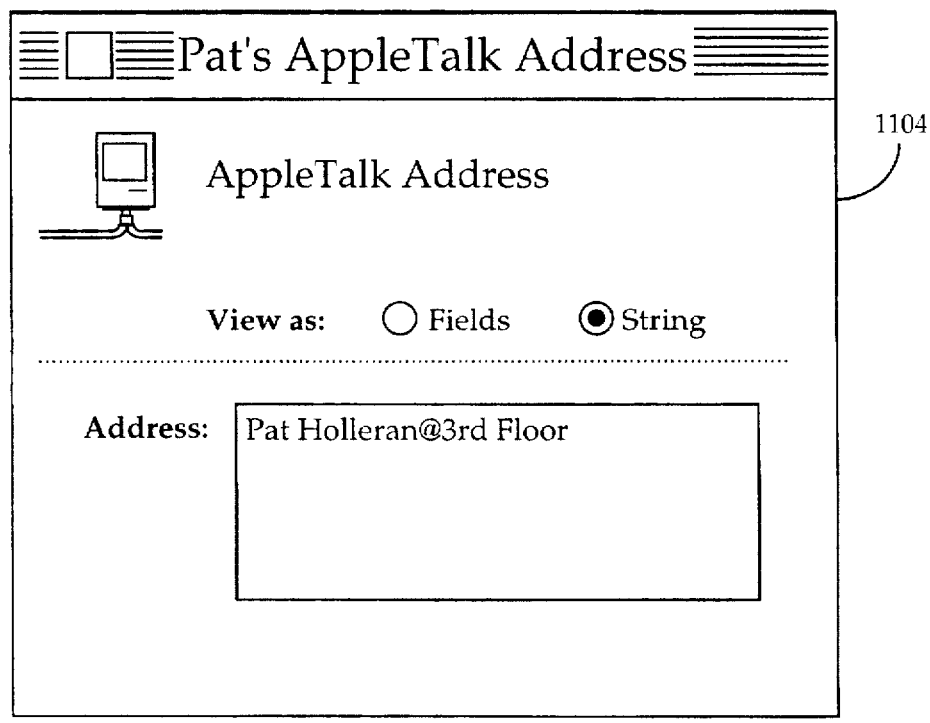
FIG. 11b shows a window displaying the contents of an address in a string format once it has been opened.

FIG. 11a shows a window 1100 displaying the contents of Pat's AppleTalk Address once it has been opened. These contents are displayed as fields representing each component (e.g., "Name" field 1101 and "Zone" field 1102). By positioning a moveable cursor over the "string" button 1103 and selecting it, a user may choose to view this address as a string (i.e., a sequence of characters in a standard syntax characteristic of that type of address. FIG. 11*b* shows a window 1104 displaying an address in string format. The string format is one commonly associated with addresses printed on business cards. A user can have the address displayed either in a field or a string format. When information is changed in one view, it will be displayed correctly when the user switches to the alternate view.

Figure 12A:
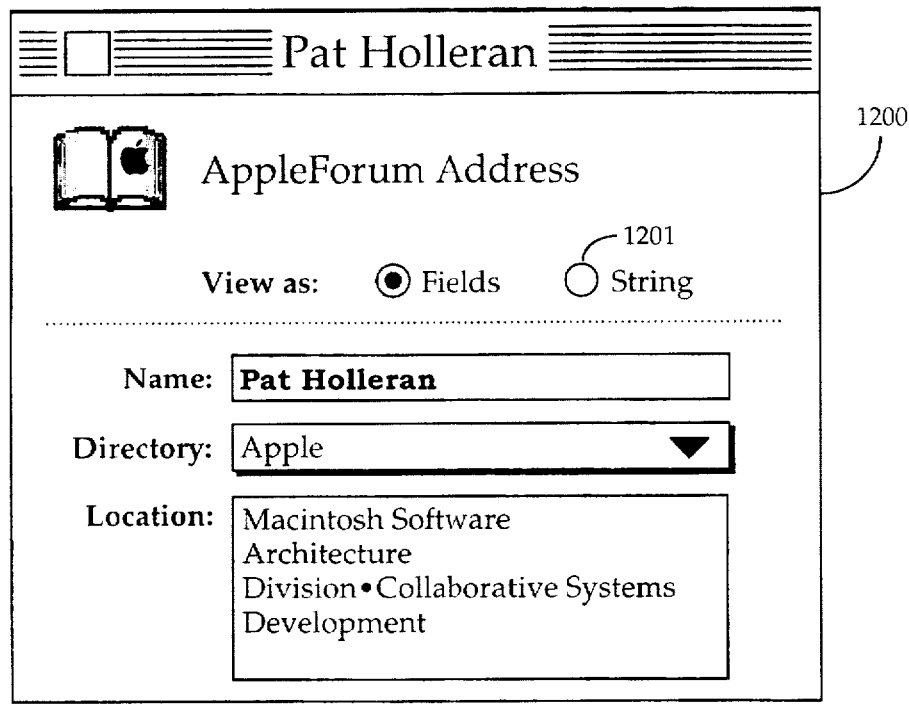
FIG. 12a show an address displayed in a field format as may be utilized in a server system.
Figure 12B:
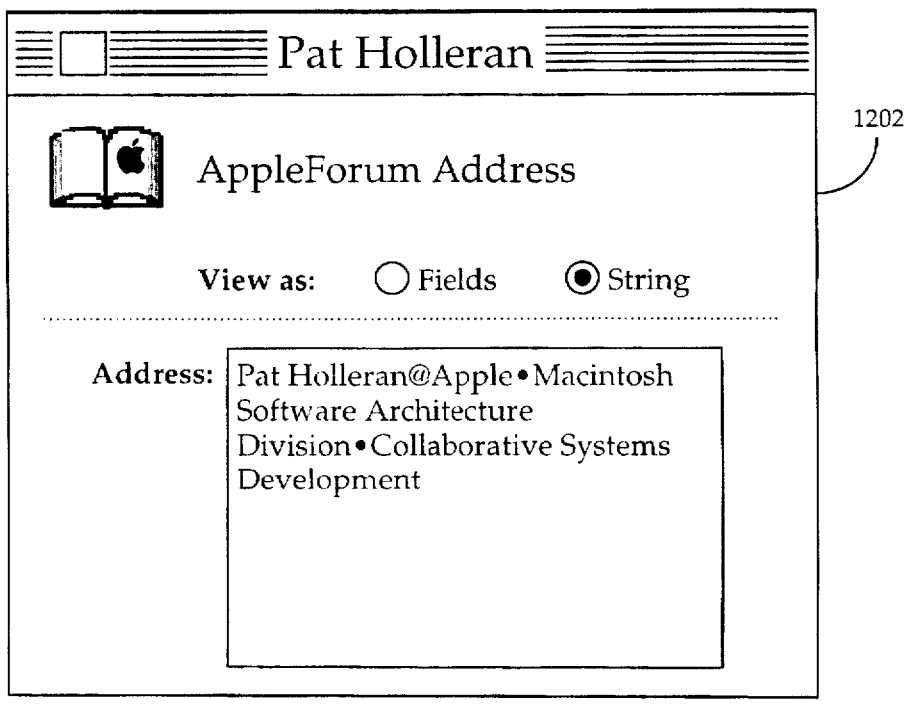
FIG. 12b shows an address displayed in a string format as may be utilized in a server system.

FIG. 12*a* shows a window 1200 displaying an address in a field format as may be utilized with a server system. The "Name", "Directory", and "Location" of Pat's address is displayed. By positioning a moveable cursor over "String" button 1201 and clicking on it, a user can select the same address information to be displayed in a string format as shown in window 1202 of FIG. 12*b*. A user can select to have the address displayed either as a field format of window 1200 or as a string format of window 1202. Editing the address information in one of the formats produces the same edit in the other format.

Figure 13:
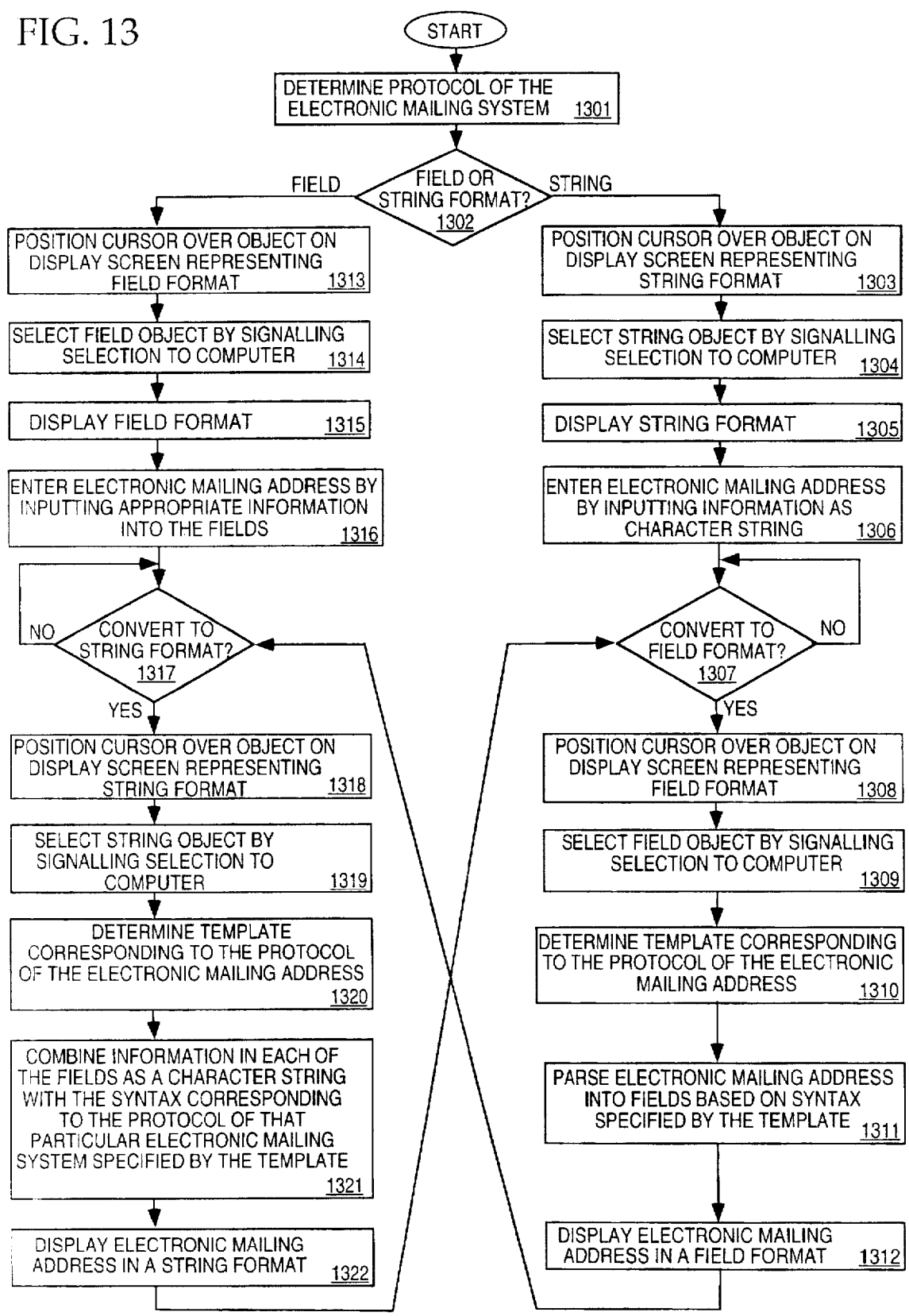
FIG. 13 is a flowchart illustrating the steps for implementing the present invention.

FIG. 13 is a flowchart depicting the steps for implementing the present invention. The protocol corresponding to that particular electronic mailing system is determined, step 1301. The user decides whether the electronic mailing address is to be entered in a field format or a string format, step 1302. If the user decides on the string format, the user positions a cursor over the object on the display screen representing the string format, step 1303. The string object is selected by signaling the selection to the computer, step 1304. The string format is displayed, step 1305. The electronic mailing address is entered by inputting the address information as a character string (i.e., a series of characters), step 1306. The user decides whether to convert to a field format, step 1307. If the user subsequently wishes to convert to a field format, the cursor is positioned over the object on the display screen representing the field format and selects it, steps 1308–1309. The template corresponding to the protocol of that electronic mailing system is determined, step 1310. The electronic mailing address entered as a character string is parsed into the appropriate fields based on the syntax specified by the template, step 1311. The electronic mailing address is displayed in a field format, step 1312. Proceed to step 1317.

If the user decides on the field format in step 1302, the user positions the cursor over the object on the display screen representing the field format, step 1313. The field object is selected by signaling the selection to the computer, step 1314. The field format is displayed, step 1315. The user enters the electronic mailing address by inputting information into the appropriate fields, step 1316. The user decides whether to convert to a string format, step 1317. If the user subsequently wishes to convert to a string format, the cursor is positioned over the object on the display screen representing the string format and selects it, steps 1318–1319. The template corresponding to the protocol of that electronic mailing system is determined, step 1320. The address information contained in each of the fields is combined into a character string having the proper syntax as specified by the template, step 1321. The electronic mailing address is displayed in a string format, step 1322. Proceed to step 1307.

Thus, an apparatus and method for representing an electronic mailing address in both a field format and a string format is disclosed.

What is claimed is:

1. In a computer system, a method of representing an electronic mail address in a field format and in a string format, wherein said electronic mail address is specified by a plurality of fields corresponding to components of said electronic mail address in said field format, and wherein said electronic mail address is specified by a character string in said string format, said method comprising the steps of:

selecting a selected electronic mail system from a plurality of electronic mail systems;

selecting either said field format or said string format as a selected format;

if said field format is selected as said selected format, then inputting said electronic mail address by inputting said components in said plurality of fields;

if said string format is selected as said selected format, then inputting said electronic mail address by inputting a series of characters;

determining a protocol of said selected electronic mail system;

determining a syntax of said protocol;

if said electronic mail address is in said field format and said string format is subsequently selected, converting said electronic mail address from said field format by combining said components in said plurality of fields according to said syntax to produce said series of characters; and if said electronic mail address is in said string format and said field format is subsequently selected, converting said electronic mail address from said string format to said field format by parsing said series of characters into said plurality of fields according to said syntax.

2. The method of claim 1, wherein said selecting step of selecting either said field format or said string format as said selected format is comprised of the step of positioning a moveable cursor over an object corresponding to said selected format and signaling said computer system to select said selected format.

3. The method of claim 2, wherein said step of inputting said components in said plurality of fields is comprised of the steps of:

inputting a name in a name field;

inputting a directory in a directory field;

inputting at least one directory folder name in a directory folder field.

4. The method of claim 3, wherein said electronic mail address is displayed in a window on a computer display screen.

5. The method of claim 4 further comprising the step of displaying a name of said protocol within said window.

6. The method of claim 5 further comprising the step of displaying an icon representing said selected electronic mail system.

7. The method of claim 6 further comprising the step of displaying a name of a network corresponding to said electronic mail address.

8. The method of claim 1, wherein said step of selecting either said field format or said string format as said selected format includes the step of designating an object corresponding to said selected format to signal said computer system to select said selected format.

9. The method of claim 8, wherein said step of inputting said components in said plurality of fields is comprised of the steps of:

inputting a name in a name field;

inputting a directory in a directory field;

inputting at least one directory folder name in a directory folder field.

10. The method of claim 9, wherein said electronic mail address is displayed in a window on a computer display screen.

11. The method of claim 10 further comprising the step of displaying a name of said protocol within said window.

12. The method of claim 11 further comprising the step of displaying an icon representing said selected electronic mail system.

13. The method of claim 12 further comprising the step of displaying a name of said network corresponding to said electronic mail address.

14. An apparatus for depicting an electronic mail address in either a field format or a string format, wherein for said field format, said electronic mail address is parsed into a plurality of fields, each field representing a particular attribute of said electronic mail address and for said string format, said electronic mail address is comprised of a string of characters in a syntax specified by a protocol of a selected electronic mail system associated with said electronic mail address, said apparatus comprising:

a storage for storing a template having syntax information corresponding to said protocol;

a selection device for selecting either said field format or said string format as a selected format;

an input device for entering said electronic mail address, said electronic mail address being entered by inputting identifying information in at least one of said fields when said field format is selected, said electronic mail being entered by inputting a string of characters in said syntax specified by said protocol if said string format is selected;

a combiner for converting said electronic mail address from said field format to said string format by combining said identifying information in said fields according to said syntax specified by said template to produce a character string;

a parser for converting said electronic mail address from said string format to said field format by parsing said character string into separate components according to said syntax specified by said template, said components being assigned to the corresponding fields;

a display device for displaying said electronic mail address in said field format and said string format.

15. The apparatus of claim 14, further comprising a first radio button for displaying said electronic mail address in said field format and a second radio button for displaying said electronic mail address in said string format, wherein toggling between said first radio button and said second radio button causes said electronic mail address to toggle between being displayed in said field format and said string format.

16. The apparatus of claim 15, wherein said fields include a name field, a directory field, and a directory folder field.

17. The apparatus of claim 16, wherein said display device displays said electronic mail address in a window.

18. The apparatus of claim 17, wherein said window displays a name of said template.

19. The apparatus of claim 18, wherein said window displays an icon representing said selected electronic mail system.

20. The apparatus of claim 19, wherein said window displays a name of a computer network corresponding to said electronic mail address.

21. The apparatus of claim 20, wherein said selection device comprises a mouse for designating said first radio button and said second radio button.

22. The apparatus of claim 20, wherein said selection device allows selection of said first radio button and said second radio button by touching said first radio button and touching said second radio button.

23. An address display apparatus for use in a computer network, the computer network having a plurality of terminals for accessing said computer network, wherein each terminal is assigned an address specifying said terminal, the address display apparatus comprising:

a display device coupled to a terminal of said plurality of terminals, said display device displaying a first button and a second button;

a selection device coupled to said terminal, said selection device allowing selection of said first button and said second button;

wherein said display device displays an address of a selected terminal of said plurality terminals;

wherein said display device displays said address in a field format if said first button is selected; and wherein said display device displays said address in a string format if said second button is selected.

24. The address display apparatus of claim 23 further comprising an input device for inputting said address in said field format.

25. The address display apparatus of claim 24 wherein said input device allows input of said address in said string format.

26. The address display apparatus of claim 25 further comprising a translation mechanism for translating said address from said field format to said string format and from said string format to said field format.

27. The address display apparatus of claim 26, wherein said field format includes a name field and a directory field.

28. The address display apparatus of claim 27, wherein said address is displayed in a window.

29. The address display apparatus of claim 28, wherein said selection device comprises a mouse.

30. The address display apparatus of claim 28, wherein said selection device comprises a pen.

31. The address display apparatus of claim 28, wherein said selection device comprises a stylus.

32. The address display apparatus of claim 28, wherein said selection device comprises a touch sensitive screen.

\* \* \* \* \*